(12) United States Patent
Fu et al.

(10) Patent No.: US 11,518,913 B2
(45) Date of Patent: *Dec. 6, 2022

(54) FLUID COMPOSITION AND METHOD FOR CONDUCTING A MATERIAL REMOVING OPERATION

(71) Applicant: SAINT-GOBAIN CERAMICS & PLASTICS, INC., Worcester, MA (US)

(72) Inventors: Lin Fu, Rancho Palos Verdes, CA (US); Jason A. Sherlock, Anaheim, CA (US); Long Huy Bui, Orange, CA (US); Douglas E. Ward, Santa Ana, CA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/004,988

(22) Filed: Aug. 27, 2020

(65) Prior Publication Data
US 2021/0062045 A1 Mar. 4, 2021

Related U.S. Application Data

(60) Provisional application No. 62/894,050, filed on Aug. 30, 2019.

(51) Int. Cl.
*C09G 1/18* (2006.01)
*C23F 3/04* (2006.01)
*C01B 35/12* (2006.01)

(52) U.S. Cl.
CPC ............ *C09G 1/18* (2013.01); *C23F 3/04* (2013.01); *C01B 35/127* (2013.01)

(58) Field of Classification Search
None
See application file for complete search history.

(56) References Cited

U.S. PATENT DOCUMENTS

| 4,049,396 A | 9/1977 | Hiles |
| 6,068,787 A | 5/2000 | Grumbine |
| 6,705,926 B2 | 3/2004 | Zhou |
| 6,984,588 B2 | 1/2006 | Grover |

(Continued)

FOREIGN PATENT DOCUMENTS

| CN | 1242729 A | 1/2000 |
| CN | 1333317 A | 1/2002 |

(Continued)

OTHER PUBLICATIONS

International Search Report and Written Opinion dated Dec. 9, 2020 with regard to International Application No. PCT/US2020/048221.

(Continued)

*Primary Examiner* — Stephanie P Duclair
(74) *Attorney, Agent, or Firm* — Abel Schillinger, LLP; Adrian Lawrence

(57) ABSTRACT

A fluid composition suitable for chemical mechanical polishing a substrate can in include a multi-valent metal borate, at least one oxidizer, and a solvent. The fluid composition can be essentially free of abrasive particles and may achieve a high material removal rate and excellent surface finish.

17 Claims, 1 Drawing Sheet

(56) References Cited

U.S. PATENT DOCUMENTS

| | | | |
|---|---|---|---|
| 7,513,920 B2 | 4/2009 | Siddiqui | |
| 8,304,344 B2 | 11/2012 | Boggs | |
| 9,238,753 B2 | 1/2016 | Reiss | |
| 9,416,338 B2* | 8/2016 | Cooper | C11D 3/046 |
| 10,418,248 B2 | 9/2019 | Petro | |
| 2004/0134873 A1* | 7/2004 | Yao | C23F 3/00 216/2 |
| 2004/0229461 A1 | 11/2004 | Darsillo | |
| 2006/0006074 A1 | 1/2006 | Liu | |
| 2006/0118760 A1 | 6/2006 | Yang | |
| 2007/0039926 A1 | 2/2007 | Cherian | |
| 2007/0218692 A1 | 9/2007 | Wolk | |
| 2008/0076688 A1 | 3/2008 | Barnes | |
| 2009/0311864 A1 | 12/2009 | Yamada | |
| 2010/0286014 A1 | 11/2010 | Barnes | |
| 2011/0059680 A1 | 3/2011 | Motonari | |
| 2011/0186542 A1 | 8/2011 | Li | |
| 2018/0340095 A1 | 11/2018 | Ward | |

FOREIGN PATENT DOCUMENTS

| | | |
|---|---|---|
| CN | 1366547 A | 8/2002 |
| CN | 100425666 C | 10/2008 |
| CN | 103194148 A | 7/2013 |
| EP | 1118647 A1 | 7/2001 |
| TW | 200709293 A | 3/2007 |
| TW | 200736354 A | 10/2007 |
| TW | 200743665 A | 12/2007 |
| TW | 201900837 A | 1/2019 |
| WO | 2004/104122 A2 | 12/2004 |
| WO | 2004104122 A1 | 12/2004 |
| WO | 2009064365 A2 | 5/2009 |
| WO | 2018217978 A1 | 11/2018 |

OTHER PUBLICATIONS

International Search Report and Written Opinion dated Dec. 11, 2020 with regard to International Application No. PCT/US2020/048230.

* cited by examiner

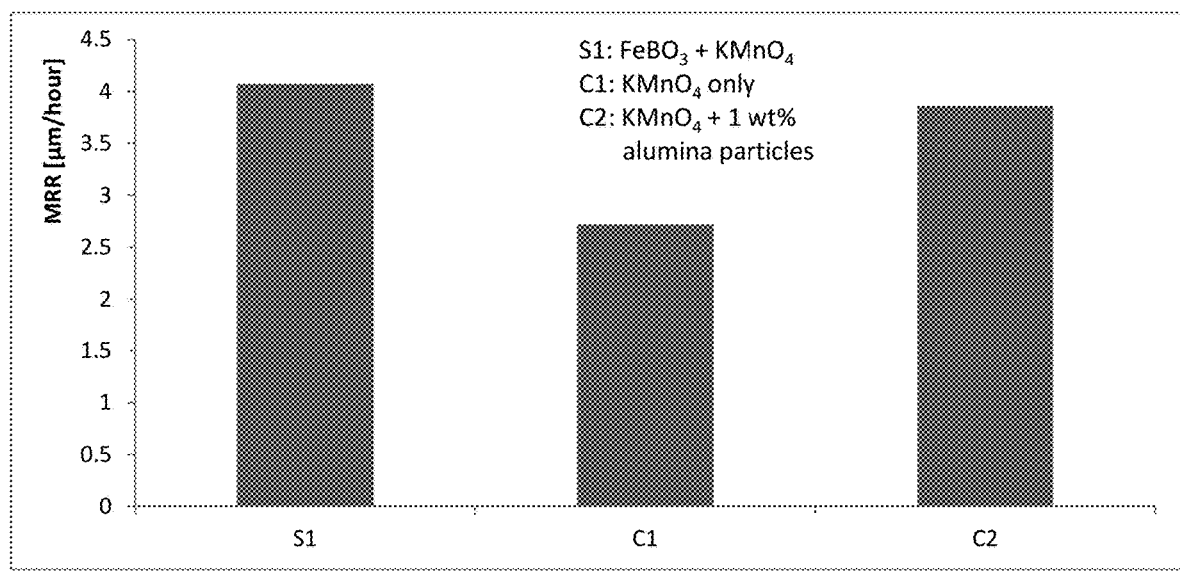

FLUID COMPOSITION AND METHOD FOR CONDUCTING A MATERIAL REMOVING OPERATION

CROSS-REFERENCE TO RELATED APPLICATION(S)

This application claims priority under 35 U.S.C. § 119(e) to U.S. Patent Application No. 62/894,050, entitled "FLUID COMPOSITION AND METHOD FOR CONDUCTING A MATERIAL REMOVING OPERATION," by Lin F U et al., filed Aug. 30, 2019, which is assigned to the current assignee hereof and incorporated herein by reference in its entirety.

FIELD OF THE DISCLOSURE

The present disclosure relates to a fluid composition for conducting a material removal operation, specifically a fluid composition including a multi-valent metal borate, an oxidizing agent, and a solvent, and a method of conducting the material removing operation.

BACKGROUND

Fluid compositions which assist a polishing process, e.g., polishing a substrate with a polishing pad, have a large variety of applications, for example, for polishing of glass, ceramic, or metal materials, and are often designed for use in a chemical mechanical planarization (CMP) process. In a typical CMP process, the relative movement of the slurry to a substrate to be polished assists with the planarization (polishing) process by chemically and mechanically interacting with the exterior surface of the substrate and removing unwanted material. Polishing is conducted until a desired smooth exterior surface with a low surface roughness is obtained. There exists a need of developing cost efficient fluid compositions which can contribute to a high material removal rate during polishing and lead to polished substrates having a low surface roughness.

BRIEF DESCRIPTION OF THE DRAWINGS

The present disclosure may be better understood, and its numerous features and advantages made apparent to those skilled in the art by referencing the accompanying drawings.

FIG. 1 includes a graph illustrating the material removal rate (MRR) of a fluid composition according to one embodiment and the material removal rate of comparative fluid compositions.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a fluid composition adapted for conducting a material removing operation. The composition comprises a multi-valent metal borate, at least one oxidizing agent, and a solvent. It has been surprisingly observed that the fluid composition of the present disclosure can conduct polishing of a large variety of materials, including materials with a high hardness, such as silicon carbide or diamond, with at a high material removal rate and a desired low surface roughness. In one embodiment, the fluid composition of the present disclosure can be essentially free of abrasive particles. As used herein, essentially free of abrasive particles means an amount of abrasive particles not greater than 0.1 wt %. In another aspect, the fluid composition may be free of abrasive particles except for unavoidable impurities.

As used herein, the term "multi-valent metal" relates to a metal containing cation having an oxidation state of +2 or more. As used herein, the term "multi-valent metal borate" is a metal borate compound or complex that includes at least one multi-valent metal cation. It will be appreciated that certain multi-valent metal borate compounds include only one type of multi-valent metal cation.

For the purpose of calculating the concentrations of the multi-valent metal borate in the composition, it is assumed that neutral salts between the multi-valent metal ions and the borate ions are formed, for example, $FeBO_3$, or $AlBO_3$, or $Cu_3(BO_3)_2$.

In one embodiment, the multi-valent metal borate of the composition of the present disclosure can include iron(III) borate, copper(II)borate, cobalt(II)borate, bismuth(III)borate, aluminum(III)borate, cerium(III)borate, chromium(III) borate, ruthenium(III)borate, titanium(III)borate, lead(II) borate, or any combination thereof. In a particular embodiment, the multi-valent metal borate may be iron(III) borate. As used herein, the term "iron(III)borate" is interchangeable used with the terms "iron borate" or "$Fe^{3+}$-borate" or $FeBO_3$.

In one embodiment, the composition of the present disclosure can be made by dissolving boric acid ($H_3BO_3$) and a multi-valent metal salt (e.g., a multi-valent metal nitrate, or chloride, or sulfate salt) in the solvent, adding and dissolving at least one oxidizing agent, and adjusting the pH of the dispersion to a desired pH.

In another aspect, the multi-valent metal borate can be formed by dissolving a borate salt having monovalent cations (e.g., sodium borate or potassium borate) together with a multi-valent metal salt (e.g., a multi-valent metal nitrate, or chloride, or sulfate). In another aspect, the multi-valent metal borate can be directly added as a fine powder and dispersed in the solvent.

In one aspect, the amount of multi-valent metal borate in the fluid composition can be at least 0.010 wt % based on the total weight of the composition, or at least 0.025 wt %, or at least 0.05 wt %, or at least 0.07 wt %, or at least 0.1 wt %, or at least 0.5 wt %, or at least 1 wt %, or at least 2 wt %, or at least 3 wt %. In another aspect, the amount of the multi-valent metal borate may be not greater than 50 wt % based on the total weight of the composition, or not greater than 40 wt %, or not greater than 30 wt %, or not greater than 20 wt %, or not greater than 10 wt %, or not greater than 5 wt %, or not greater than 4 wt %, or not greater than 3 wt %, or not greater than 2 wt %, or not greater than 1 wt %, or not greater than 0.5 wt %, or not greater than 0.1 wt %, or not greater than 0.08 wt %, or not greater than 0.05 wt %. The amount of multi-valent metal borate can be a value between any of the minimum and maximum values noted above, such as at least 0.010 wt % and not greater than 5 wt %, or at least 0.05 wt % and not greater than 1 wt %, or at least 0.05 wt % and not greater than 0.2 wt % based in the total weight of the composition.

In one non-limiting embodiment, the composition may have a molar ratio of total multi-valent metal-ions to total boron within a range of 1:20 to 20:1 (metal:boron), which means it may have either an excess of multi-valent metal ions or an excess of borate ions. In one embodiment, the molar ratio of total multi-valent metal-ions to total boron can be at least 1:18, or at least 1:15, or at least 1:12, or at least 1:10, or at least 1:9, or at least 1:8, or at least 1:7, or at least 1:6, or at least 1:5, or at least 1:4, or at least 1:3, or at least 1:2. In another embodiment, the ratio of multi-valent metal-ions to boron may be not greater than 18:1, or not greater than 15:1, or not greater than 12:1, or not greater than 10:1, or not greater than 9:1, or not greater than 8:1, or not greater than 7:1, or not greater than 6:1, or not greater than 5:1, or not greater than 4:1, or not greater than 3:1 or not greater than 2:1, or not greater than 1:1.

In one aspect, the molar ratio of total multi-valent metal ions to total boron can be used to calculate a molar ratio of total multi-valent metal ions to total borate ions, which can be within the same range as the ratios noted above for total multi-valent metal ions to total boron. For example, in one non-limiting embodiment, the ratio of total multi-valent metal ions to total borate ions may be within a range of 1:20 to 20:1. It will be understood that such a calculation may be based upon an assumption that all boron in the composition is in the form of borate ions.

The oxidizing agent contained in the composition of the present disclosure can be a compound which at least partially dissolves in the solvent and has a suitable oxidation potential for chemically reacting with a surface of a substrate either alone or in combination with the multi-valent metal borate contained in the composition. It has been surprisingly observed that the efficiency of an oxidizing agent can be greatly enhanced if a multi-valent metal borate is further contained in an abrasive slurry composition. Not to be bound to theory, it is assumed that a synergistic effect is obtained of the multi-valent metal borate and the oxidizing agent when chemically altering the surface of a substrate material during polishing.

In one aspect, the oxidizing agent can have an oxidation potential of at least 0.26 V, or at least 0.4 V, or at least 0.5 V, or at least 1.0 V, or at least 1.5 V. In another aspect, the oxidation potential may be not greater than 2.8 V, or not greater than 2.5 V, or not greater than 2.0 V. As used herein, the oxidation potential is the value measured relative to the standard hydrogen electrode, at a temperature of 25° C., a pressure of 1 atm, at a concentration of 1 mol/L of the tested compound in water, and measured in Volt (V).

Non-limiting examples of oxidizing agents can be, for example, a peroxide, a permanganate, a peroxodisulfate, a chlorite, a perchlorate, a hypochlorite, an iodate, a periodate, bromine, a nitrite, a hyponitrite, a chromate, or any combination thereof. In a particular embodiment, the oxidizing agent can be selected from potassium permanganate, hydrogen peroxide, potassium persulfate, manganese oxide, or any combination thereof.

The amount of the oxidizer in the fluid composition can be at least 0.01 wt % based on the total weight of the composition, or at least 0.05 wt %, or at least 0.1 wt %, or at least 0.05 wt %, or at least 1.0 wt %, or at least 1.5 wt %, or at least 2 wt %, or at least 3 wt %. In another aspect, the amount of oxidizer can be not greater than 40 wt %, such as not greater than 30 wt %, not greater than 20 wt %, not greater than 10 wt %, not greater than 7 wt %, not greater than 5 wt %, not greater than 3 wt %, not greater than 2 wt %, not greater than 1 wt %, or not greater than 0.5 wt % based on the total weight of the composition. The amount of the oxidizer can be a value between any of the minimum and maximum values noted above, such as at least 0.01 wt % and not greater than 10 wt %, or at least 1 wt % and not greater than 5 wt %, based on the total weight of the composition.

In one embodiment, the molar ratio of the multi-valent metal borate to the oxidizing agent can be not greater than 1:10, or not greater than 1:20, or not greater than 1:25, or not greater than 1:30, or not greater than 1:35, or not greater than 1:40. In another embodiment, the molar ratio of the multi-valent metal borate to the oxidizing agent may be at least 1:100, or at least 1:80, or least 1:60, or at least 1:50.

In a particular embodiment, the solvent of the fluid composition of the present disclosure can be water, but is not limited thereto. In one aspect, the solvent can be a mixture of water and one or more other polar and/or non-polar solvents.

The fluid composition can further comprise one or more optional additives, for example a surfactant, or a dispersant, or a chelating agent, a pH buffer, a rheology modifier, a corrosion resistant agent, or any combination thereof.

In a certain embodiment, the fluid composition of the present disclosure can consist essentially of iron borate, a permanganate salt, and water. Consisting essentially means in this regard that an amount of other ingredients or impurities contained in the fluid composition is not greater than 0.1 wt %.

The pH of the fluid composition can be within a range of at least 1 and not greater than 9. In certain aspects, the pH can be at least 1.3, or at least 1.5, or at least 1.7, or at least 1.9, or at least 2.0. In other aspects, the pH of the composition may be not greater than 8.5, such as not greater than 8, or not greater than 7, or not greater than 5, or not greater than 4, or not greater than 3.5, or not greater than 3.0, or not greater than 2.5, or not greater than 2.3. The pH of the fluid composition can be a value between any of the minimum and maximum values noted above, such as at least 1 and not greater than 9, at least 1.5 and not greater than 5, or at least 1.8 and not greater than 3.5.

In another embodiment, the fluid composition of the present disclosure can be used as a base composition for an abrasive slurry including abrasive particles. In one aspect, the abrasive particles may not be limited to a specific material type and can include, for example, zirconia, alumina, silica, diamond, cubic boron nitride, ceria, iron oxide, titanium oxide, manganese oxide, lanthanium oxide, or any combination thereof. In a particular aspect, the abrasive particles can be selected from alumina, zirconia, manganese dioxide, ceria, silica, diamond, or iron oxide. In one certain aspect, the abrasive particles can be alumina. In another certain aspect, the abrasive particles can be zirconia.

The average size (D50) of the abrasive particles can be at least 10 nm, or at least 25 nm, or at least 50 nm, at least 80 nm, at least 100 nm, at least 130 nm, or at least 150 nm, at least at least 180 nm, or at least 200 nm, or at least 250 nm. In another embodiment, the average particle size may be not greater than 50 microns, such as not greater than 20 microns, not greater than 10 microns, not greater than 5 microns, not greater than 1 micron, not greater than 0.8 microns, not greater than 0.5 microns, or not greater than 0.3 microns. The average particle size of the abrasive particles can be a value between any of the minimum and maximum values noted above, for example, at least 50 nm and not greater than 500 nm, at least 70 nm and not greater than 250 nm, or at least 80 nm and not greater than 200 nm.

In one embodiment, the amount of the abrasive particles can be at least 0.01 wt % based on a total weight of the composition, or at least 0.05 wt %, or at least 0.1 wt %, or at least 0.5 wt %, or at least 1 wt %, or at least 2 wt %, or at least 3 wt %, or at least 4 wt %, or at least 5 wt %. In another embodiment, the amount of the abrasive particles can be not greater than 50 wt %, such as not greater than 40 wt %, or not greater than 30 wt %, or not greater than 20 wt %, or not greater than 15 wt %, or not greater than 10 wt %, or not greater than 8 wt %, or not greater than 5 wt %. The amount of abrasive particles can be a value between any of the minimum and maximum values noted above. In a particular aspect, the amount of abrasive particles can be at least 0.1 wt % and not greater than 5 wt %.

The present disclosure is further directed to a method of polishing a substrate. The method can comprise: providing the fluid composition of the present disclosure described above, bringing the fluid composition in direct contact with the substrate; and polishing the substrate surface. In one aspect, the substrate can be polished with a polishing pad, wherein the polishing pad and the substrate are moving relative to one another and the fluid composition is in contact with the substrate and the polishing pad.

In one embodiment, the temperature of the fluid composition during polishing can be at least 40° C., or at least 45° C., or at least 50° C., or at least 55° C., or at least 60° C., or at least 65° C. In another embodiment, the temperature of the composition during polishing may be not greater than 90° C., or not greater than 85° C., or not greater than 80° C., or not greater than 75° C., or not greater than 70° C. The temperature of the composition during polishing can be a value in a range between any of the minimum and maximum values noted above.

It has been surprisingly discovered that the fluid composition of the present disclosure can assist a chemical mechanical polishing process and may contribute to a high material removal rate when polishing a substrate, together with a smooth exterior surface of the polished substrate with a low surface roughness.

In one embodiment the substrate to be polished can include a ceramic material, a metal, a metal alloy, diamond, or a polymer. In a particular embodiment, the substrate can be a group III-V compound, for example, gallium nitride. In another particular embodiment, the substrate can be a group IV-IV compound, for example, silicon carbide. Non-limiting examples of a polymer can be a polyacrylate, a polymethacrylate, a polyimide, a polyolefine, a polyacrylamide, a polyester, a polyurethane, or any combination, such as co-polymers of cross-polymers thereof, as used, e.g., in a photo-resist.

In a particular aspect, the fluid composition and method of the present disclosure can be adapted for polishing a silicon carbide substrate with a material removal rate of at least 2.0 µm/hour, or at least 3 µm/hour, or at least 3.5 µm/hour, or at least 4 µm/hour.

In another particular aspect, the fluid composition and method of the present disclosure can be adapted for polishing a silicon carbide substrate wherein a surface roughness of the substrate after polishing can be not greater than 5 Å, or not greater than 4 Å, or not greater than 3 Å, or not greater than 2.5 Å, or not greater than 2 Å.

As further demonstrated in the Examples below, it has been surprisingly observed that the fluid composition of the present disclosure, without the addition of abrasive particles, can be suitable for chemical mechanical polishing a substrate with a high material removal rate and excellent surface finish.

In a further non-limiting embodiment, the fluid composition of the present disclosure can be also used for water purification. Oxidizing agents, for example, permanganate, can also have wide use for degrading organic materials and metal impurities in water, wherein the metal is converted to metal ions. As shown in the examples of the present disclosure, the synergistic effect of permanganate with multi-valent metal borate on the material removal rate during polishing, particularly permanganate combined with iron borate, may also enhance the efficiency of the treatment of metal polluted water.

In another embodiment, the present disclosure is directed to a kit adapted to preparing a fluid composition, and a method of polishing a substrate using the fluid composition made by the kit. The kit can comprise a first package and a second package (herein also called "two-package kit"), wherein the first package may comprise a multi-valent metal salt, and the second package may comprise boric acid. In a certain particular aspect, the fluid composition made from the two-package kit can be essentially free of abrasive particles. It has been surprisingly observed that a fluid composition prepared by the two-package kit can have over a longer time period a desired polishing efficiency than a fluid composition which contains all ingredients in one package. Not being bound to theory, it is assumed that forming the multi-valent metal borate in-situ, short before conducting a polishing operation, may have an advantage compared to a composition wherein the multi-valent metal borate is contained for a longer period of time.

The fluid composition obtained from the kit, after combining the first package and the second package, can correspond to the same fluid composition as described above for polishing a substrate, having the same properties and features. In one aspect, the at least one oxidizing agent can be contained in the first package or the second package of the kit. In a particular aspect, the at least one oxidizing agent may be contained together with the boric acid and the solvent in the first package, while the second package can contain the multi-valent metal salt and solvent.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A fluid composition comprising: a multi-valent metal borate; at least one oxidizing agent; and a solvent.

Embodiment 2

The fluid composition of Embodiment 1, wherein the multi-valent metal borate includes iron(III)borate, copper(II)borate, cobalt(II)borate, bismuth(III)borate, aluminum (III)borate, cerium(III)borate, chromium(III)borate, ruthenium(III)borate, titanium(III)borate, lead(II)borate, or any combination thereof.

Embodiment 3

The fluid composition of Embodiment 2, wherein the multi-valent metal borate includes iron(III)borate, copper(II)borate, cobalt(II)borate, bismuth(III)borate, aluminum(III)borate, cerium(III)borate, or any combination thereof.

Embodiment 4

The fluid composition of Embodiment 3, wherein the multi-valent metal borate consists essentially of iron(III) borate.

Embodiment 5

The fluid composition of any of the preceding Embodiments, wherein the composition is essentially free of abrasive particles.

Embodiment 6

The fluid composition of Embodiment 5, wherein the fluid composition is free of abrasive particles.

Embodiment 7

The fluid composition of any of the preceding Embodiments, wherein an amount of the multi-valent metal borate is at least 0.010 wt % based on the total weight of the fluid composition, or at least 0.025 wt %, or at least 0.05 wt %, or at least 0.07 wt %, or at least 0.1 wt %, or at least 0.3 wt %, or at least 0.5 wt %, or at least 0.07 wt %, or at least 1.0 wt %, or at least 1.5 wt %, or at least 2.0 wt %.

Embodiment 8

The fluid composition of any of the preceding Embodiments, wherein an amount of the multi-valent metal borate is not greater than 50 wt %, or not greater than 40 wt %, or not greater than 30 wt %, or not greater than 20 wt %, or not greater than 10 wt %, or not greater than 5 wt %, or not greater than 4 wt %, or not greater than 3 wt %, or not greater than 2 wt %, or not greater than 1 wt %, or not greater than 0.5 wt %, or not greater than 0.1 wt % based on the total weight of the composition.

Embodiment 9

The fluid composition of any of the preceding Embodiments, wherein an amount of the multi-valent metal borate is at least 0.010 wt % and not greater than 5 wt %, or at least 0.05 wt % and not greater than 0.2 wt %.

Embodiment 10

The fluid composition of any of the preceding Embodiments, wherein the fluid composition comprises a molar ratio of total multi-valent metal-ions to total boron within a range of 1:20 to 20:1.

Embodiment 11

The fluid composition of Embodiment 10, wherein the molar ratio of total multi-valent metal-ions to total boron is at least 1:18, or at least 1:15, or at least 1:12, or at least 1:10, or at least 1:9, or at least 1:8, or at least 1:7, or at least 1:6, or at least 1:5, or at least 1:4, or at least 1:3, or at least 1:2.

Embodiment 12

The fluid composition of Embodiment 10, wherein the molar ratio of total multi-valent metal-ions to total boron is not greater than 18:1, or 15:1, or 12:1, or 10:1, or 9:1, or not greater than 8:1, or not greater than 7:1, or not greater than 6:1, or not greater than 5:1, or not greater than 4:1, or not greater than 3:1 or not greater than 2:1, or not greater than 1:1.

Embodiment 13

The fluid composition of Embodiment 10, wherein the molar ratio of multi-valent metal-ions to boron ranges from 1:1 to 1:7.

Embodiment 14

The fluid composition of any of the preceding Embodiments, wherein an oxidation potential of the at least one oxidizing agent is at least 0.26 V, or at least 0.4 V, or at least 0.5 V, or at least 1.0 V, or at least 1.5 V.

Embodiment 15

The fluid composition of any of the preceding Embodiments, wherein an oxidation potential of the at least one oxidizing agent is not greater than 2.8 V.

Embodiment 16

The fluid composition of any of the preceding Embodiments, wherein the at least one oxidizing agent includes a peroxide, a permanganate, a peroxodisulfate, a chlorite, a perchlorate, a hypochlorite, a nitrite, a hyponitrite, an iodate, a periodate, a chromate, manganese oxide, or any combination thereof.

Embodiment 17

The fluid composition of Embodiment 16, wherein the oxidizing agent consists essentially of a permanganate.

Embodiment 18

The fluid composition of Embodiment 17, wherein the permanganate is potassium permanganate.

Embodiment 19

The fluid composition of any of the preceding Embodiments, wherein an amount of the oxidizer is at least 0.01 wt % based on the total weight of the fluid composition, or at least 0.05 wt %, or at least 0.1 wt %, or at least 0.05 wt %, or at least 1.0 wt %, or at least 1.5 wt %, or at least 2 wt %, or at least 3 wt %.

Embodiment 20

The fluid composition of any of the preceding Embodiments, wherein an amount of the oxidizer is not greater than 40 wt %, such as not greater than 30 wt %, not greater than 20 wt %, not greater than 10 wt %, not greater than 7 wt %, not greater than 5 wt %, not greater than 3 wt %, not greater than 2 wt %, not greater than 1 wt %, or not greater than 0.5 wt % based on the total weight of the fluid composition.

Embodiment 21

The fluid composition of Embodiments 19 or 20, wherein the amount of oxidizer is at least 0.01 wt % and not greater than 10 wt %, or at least 1 wt % and not greater than 5 wt % based on the total weight of the composition.

Embodiment 22

The fluid composition of any of the preceding Embodiments, wherein the solvent includes water.

Embodiment 23

The fluid composition of any of the preceding Embodiments, wherein a pH is at least 1.0, or at least 1.3, or at least 1.5, at least 1.7, at least 1.9, at least 2.0, at least 2.1, at least 2.2, at least 2.3, at least 2.4, or at least 2.5.

Embodiment 24

The fluid composition of any of the preceding Embodiments, wherein the pH is not greater than 9, or not greater than 7, or not greater than 5, or not greater than 4, or not greater than 3.8, or not greater than 3.5, or not greater than 3.2, or not greater than 3.0, or not greater than 2.8, or not greater than 2.5, or not greater than 2.3.

Embodiment 25

The fluid composition of any of the preceding Embodiments, wherein a pH of the composition is at least 1 and not greater than 9, or at least 1.5 and not greater than 5, or at least 1.8 and not greater than 3.5.

Embodiment 26

The fluid composition of any of the preceding Embodiments, wherein the fluid composition is adapted for chemical mechanical polishing of a substrate.

Embodiment 27

The fluid composition of Embodiment 26, wherein the substrate includes a ceramic material, a metal, a metal alloy, diamond, or a polymer.

Embodiment 28

The fluid composition of Embodiment 27, wherein the ceramic material includes a group III-V compound or a group IV-IV compound.

Embodiment 29

The fluid composition of Embodiments 26 or 27, wherein the ceramic material includes gallium nitride or silicon carbide.

Embodiment 30

The fluid composition of any of the preceding Embodiments, wherein the composition further comprises a surfactant, or a dispersant, or a chelating agent, or a pH buffer, or a rheology modifier, or a corrosion resistant agent, or any combination thereof.

Embodiment 31

The fluid composition of any of the preceding Embodiments, consisting essentially of iron borate, a permanganate salt, and water.

Embodiment 32

The fluid composition of any of the preceding Embodiments, wherein the fluid composition is adapted for polishing a silicon carbide substrate with a material removal rate of at least 2 μm/hour and a surface roughness of not greater than 5.0 Å.

Embodiment 33

The fluid composition of Embodiment 32, wherein the material removal rate for polishing the silicon carbide substrate is at least 2.5 μm/hour, or at least 3.0 μm/hour, or at least 3.2 μm/hour, or at least 3.4 μm/hour, or at least 3.6 μm/hour, or at least 3.8 μm/hour, or at least 4.0 μm/hour.

Embodiment 34

The fluid composition of Embodiment 32, wherein the surface roughness after polishing the silicon carbide substrate is not greater than 4 Å, or not greater than 3 Å, or not greater than 2.8 Å, or not greater than 2.6 Å, or not greater than 2.4 Å, or not greater than 2.2 Å, or not greater than 2.0 Å.

Embodiment 35

A method of preparing a fluid composition, comprising:
forming a multi-valent metal borate by dissolving a multi-valent metal salt and boric acid or an alkali borate in a solvent, wherein an anion of the multi-valent metal salt is selected from nitrate, chloride, or sulfate;
dissolving at least one oxidizing agent in the solvent; and adjusting a pH between 1 and 9.

Embodiment 36

The method of Embodiment 35, wherein a molar ratio of the multi-valent metal borate to the oxidizing agent is not greater than 1:20, or not greater than 1:25, or not greater than 1:30, or not greater than 1:35, or not greater than 1:40.

Embodiment 37

The method of Embodiment 35, wherein the multi-valent metal borate includes iron(III)borate and the oxidizing agent includes a permanganate.

Embodiment 38

The method of any of Embodiments 35-37, wherein the fluid composition comprises a molar ratio of multi-valent metal ions to boron in a range of 1:20 and 20:1.

Embodiment 39

The method of Embodiment 38, wherein the molar ratio of multi-valent metal ions to boron is at least 1:18, or at least 1:15, or at least 1:12, or at least 1:10, or at least 1:9, or at least 1:8, or at least 1:7, or at least 1:6, or at least 1:5, or at least 1:4, or at least 1:3, or at least 1:2.

Embodiment 40

The method of Embodiment 38, wherein the molar ratio of multi-valent metal ions to boron is not greater than 18:1, or not greater than 15:1, or not greater than 12:1, or not greater than 10:1, or not greater than 9:1, or not greater than 8:1, or not greater than 7:1, or not greater than 6:1, or not greater than 5:1, or not greater than 4:1, or not greater than 3:1 or not greater than 2:1, or not greater than 1:1.

Embodiment 41

The method of Embodiment 38, wherein the molar of multi-valent metal ions to boron ranges from 1:1 to 1:7.

Embodiment 42

The method of any of Embodiments 35-41, wherein the fluid composition is essentially free of abrasive particles.

Embodiment 43

A method of polishing a substrate, comprising:
providing a fluid composition, wherein the fluid composition comprises a multi-valent metal borate, at least one oxidizing agent and water; bringing the fluid composition in contact with the substrate and a polishing pad; and polishing the substrate.

Embodiment 44

The method of Embodiment 43, wherein the fluid composition is essentially free of abrasive particles.

Embodiment 45

The method of Embodiments 43 or 44, wherein the fluid composition is free of abrasive particles.

Embodiment 46

The method of any of Embodiments 43-45, wherein the substrate includes a ceramic material, a metal, a metal alloy, diamond, or a polymer, a group III-V compound, or a IV-IV compound.

Embodiment 47

The method of Embodiment 46, wherein the substrate is silicon carbide or gallium nitride.

Embodiment 48

The method of any of Embodiments 43-47, wherein polishing is conducted at a removal rate of the substrate of at least 2.0 μm/hour, or at least 3 μm/hour, or at least 3.5 μm/hour, or at least 4 μm/hour.

Embodiment 49

The method of any of Embodiments 43-48, wherein a surface roughness of the substrate after polishing is not greater than 5 Å, or not greater than 4 Å, or not greater than 3 Å, or not greater than 2.5 Å, or not greater than 2 Å.

Embodiment 50

The method of any of Embodiments 35-49, wherein an oxidation potential of the at least one oxidizer is at least 0.26 V, or at least 0.4 V, or at least 0.5 V, or at least 1.0 V, or at least 1.5 V.

Embodiment 51

The method of any of Embodiments 35-50, wherein an oxidation potential of the oxidizer is not greater than 2.8 V.

Embodiment 52

The method of any of Embodiments 35-51, wherein the at least one oxidizing agent includes a peroxide, a peroxodisulfate, a permanganate, chlorite, a nitrite, a hyponitrite, a perchlorate, a hypochlorite, manganese oxide, or any combination thereof.

Embodiment 53

The method of Embodiment 52, wherein the oxidizing agent consists essentially of a permanganate.

Embodiment 54

The method of Embodiment 53, wherein the permanganate includes potassium permanganate.

Embodiment 55

The method of any of Embodiments 35-54, wherein an amount of the multi-valent metal borate is at least 0.010 wt % and not greater than 5 wt %, or at least 0.05 wt % and not greater than 1 wt %, or at least 0.05 wt % and not greater than 0.3 wt % based in the total weight of the composition.

Embodiment 56

The method of any of Embodiments 35-55, wherein the amount of the oxidizing agent is at least 0.01 wt % and not greater than 10 wt %, or at least 0.5 wt % and not greater than 5 wt % based on the total weight of the composition.

Embodiment 57

The method of any of Embodiments 35-56, wherein the solvent includes water.

Embodiment 58

The method of any of Embodiments 35-57, wherein the pH of the fluid composition is at least 1.3, or at least 1.5, at least 1.7, at least 1.9, at least 2.0, at least 2.1, at least 2.2, at least 2.3, at least 2.4, or at least 2.5.

Embodiment 59

The method of any of Embodiments 35-58, wherein the pH of the fluid composition is not greater than 8.5, or not greater than 7, or not greater than 5, or not greater than 4, or not greater than 3.8, or not greater than 3.5, or not greater than 3.2, or not greater than 3.0, or not greater than 2.8, or not greater than 2.5, or not greater than 2.3.

Embodiment 60

The method of any of Embodiments 35-59, wherein the pH of the fluid composition is at least 1.3 and not greater than 8, or at least 1.5 and not greater than 5, or at least 1.8 and not greater than 3.5.

Embodiment 61

The method of any of Embodiments 35-60, wherein the fluid composition is essentially free of abrasive particles.

Embodiment 62

A kit adapted to preparing a fluid for polishing a substrate, the kit comprising a first package and a second package, wherein the first package comprises a multi-valent metal salt, and the second package comprises boric acid.

Embodiment 63

The kit of Embodiment 62, wherein the kit is adapted that after combining package 1 and package 2 a multi-valent metal borate is formed in-situ.

Embodiment 64

The kit of Embodiments 62 or 63, wherein the first package or the second package further comprises at least one oxidizing agent.

Embodiment 65

The kit of any one of Embodiments 62-64, wherein the second package further comprises at least one oxidizing agent.

Embodiment 66

The kit of any one of Embodiments 62-65, wherein the multi-valent metal ion of the multi-valent metal salt includes $Fe^{3+}$, $Fe^{2+}$, $Co^{2+}$, $Ce^{3+}$, $Bi^{3+}$, $Al^{3+}$, $Ru^{3+}$, $Ti^{3+}$, $Pb^{2+}$, or any combination thereof.

Embodiment 67

The kit of Embodiment 66, wherein the multi-valent metal ion includes $Fe^{3+}$ or $Cu^{2+}$.

Embodiment 68

The kit of Embodiment 67, wherein the multi-valent metal ion consists essentially of $Fe^{3+}$.

Embodiment 69

The kit of any one of Embodiments 62-68, wherein the first package is essentially free of boron.

Embodiment 70

The kit of any one of Embodiments 62-69, wherein an anion of the multi-valent metal salt includes nitrate, chloride, bromide, iodide, sulfate, phosphate or any combination thereof.

Embodiment 71

The kit of any one of Embodiments 62-70, wherein the at least one oxidizing agent includes a permanganate, a peroxodisulfate, a chlorite, a perchlorate, a hypochlorite, a nitrite, a hyponitrite, an iodate, a periodate, a chromate, a peroxide, manganese oxide, or any combination thereof.

Embodiment 72

The kit of Embodiment 71, wherein the at least one oxidizing agent includes a permanganate salt.

Embodiment 73

The kit of Embodiment 72, wherein the at least one oxidizing agent includes potassium permanganate.

Embodiment 74

The kit of any one of Embodiments 62-74, wherein the kit is essentially free of abrasive particles.

Embodiment 75

A method of polishing a substrate, comprising: preparing a fluid composition, wherein preparing the fluid composition comprises combining a first package and a second package, the first package and the second package being parts of a kit, wherein the first package comprises a multi-valent metal salt and the second package comprises boric acid; bringing the fluid composition in contact with the substrate and a polishing pad; and polishing the substrate.

Embodiment 76

The method of Embodiment 75, wherein combining the first package and the second packages comprises in-situ forming of a multi-valent metal borate.

Embodiment 77

The method of Embodiments 75 or 76, wherein preparing the fluid composition is conducted on the same day as the polishing of the substrate.

Embodiment 78

The method of any one of Embodiments 75-77, wherein the first package or the second package further comprises at least one oxidizing agent.

Embodiment 79

The method of any one of Embodiments 75-78, wherein the second package further comprises at least one oxidizing agent.

Embodiment 80

The method of any one of Embodiments 75-79, wherein the multi-valent metal ion of the multi-valent metal salt includes $Fe^{3+}$, $Fe^{2+}$, $Co^{2+}$, $Ce^{3+}$, $Bi^{3+}$, $Al^{3+}$, $Ru^{3+}$, $Ti^{3+}$, $Pb^{2+}$, or any combination thereof.

Embodiment 81

The method of Embodiment 80, wherein the multi-valent metal ion includes $Fe^{3+}$ or $Cu^{2+}$.

Embodiment 82

The method of Embodiment 81, wherein the multi-valent metal ion consists essentially of $Fe^{3+}$.

Embodiment 83

The method of any one of Embodiments 75-82, wherein the first package is essentially free of boron.

Embodiment 84

The method of any one of Embodiments 75-83, wherein an anion of the multi-valent metal salt includes nitrate, chloride, bromide, iodide, phosphate, sulfate, or any combination thereof.

Embodiment 85

The method of any of Embodiments 75-84, wherein the pH of the fluid composition is at least 1.3, or at least 1.5, at least 1.7, at least 1.9, at least 2.0, at least 2.1, at least 2.2, at least 2.3, at least 2.4, or at least 2.5.

Embodiment 86

The method of any of Embodiments 75-85, wherein the pH of the fluid composition is not greater than 8.5, or not greater than 7, or not greater than 5, or not greater than 4, or not greater than 3.8, or not greater than 3.5, or not greater than 3.2, or not greater than 3.0, or not greater than 2.8, or not greater than 2.5, or not greater than 2.3.

Embodiment 87

The method of any of Embodiments 75-86, wherein the pH of the fluid composition is at least 1.3 and not greater than 8, or at least 1.5 and not greater than 5, or at least 1.8 and not greater than 2.5.

Embodiment 88

The method of any one of Embodiments 75-87, wherein the fluid composition prepared by the kit is essentially free of abrasive particles.

Embodiment 89

The method of any one of Embodiments 74-86, further including any one of embodiments 43-61.

EXAMPLES

The following non-limiting examples illustrate the present invention.

Example 1

An aqueous fluid composition (S1) was prepared by dissolving in 955 ml distilled water under stirring 2.5 g (6.19 mmol) iron(III)nitrate nonahydrate ($Fe(NO_3)_3 \cdot 9H_2O$), 2.5 g (40.3 mmol) boric acid ($H_3BO_3$), and 40.0 g (253.2 mmol) potassium permanganate (KMnO4). After combining all ingredients, the pH was adjusted with 1N $HNO_3$ to a pH of 2.1. According to the molar amounts of the ingredients, the molar ratio of Fe3+ ions to borate ions ($BO_3^{3-}$) was 1:6.5.

A comparative fluid composition C1 was prepared the same way as slurry S1, except that no boric acid was included and no $Fe^{3+}$-ion salt, such that it only contained the same type and amount of the oxidizing agent ($KMnO_4$) as sample S1 and was adjusted to the same pH of 2.1.

A comparative slurry composition C2 was prepared similar as comparative slurry C1, except that 1 wt % alpha alumina particles with an average particle size of 100 nm was further included.

The polishing properties of the slurries were tested and compared by polishing a silicon carbide substrate using a Strasbaugh 6EC Polishing Tool.

A summary of the tested compositions and the test results, such as the material removal rate (MMR) and the surface roughness after polishing, can be seen in Table 1.

TABLE 1

| Sample | Abrasive particles | Metal-Ions | Metal-Ions [mmol/kg] | $H_3BO_3$ [mmol/kg] | $KMnO_4$ [mmol/kg] | MMR [µm/hr] | Surface Roughness [Å] | pH | Observations |
|---|---|---|---|---|---|---|---|---|---|
| S1 | — | $Fe^{3+}$ | 6.19 | 40.3 | 253.2 | 4.07 | 2.0 | 2.1 | |
| S2 | — | $Fe^{3+}$ | 30.94 | 202.2 | 253.2 | 5.21 | 2.3 | 2.1 | |
| S3 | — | $Cu^{2+}$ | 30.94 | 202.2 | 253.2 | 5.54 | 2.9 | 2.1 | |
| S4 | — | $Co^{2+}$ | 30.94 | 202.2 | 253.2 | 3.30 | 2.4 | 2.1 | |
| C1 | — | — | — | — | 253.2 | 2.72 | 2.2 | 2.1 | scratches & pitches |
| C2 | 1 wt % alumina | — | — | — | 253.2 | 3.86 | | 2.1 | scratches & pitches |
| C3 | — | — | — | 202.2 | 253.2 | 3.41 | 2.3 | 2.1 | |

As further illustrated in FIG. 1, it can be seen that the fluid composition with the combination of iron borate and oxidizer ($KMnO_4$), see sample S1, had a high silicon carbide removal rate of 4.07 µm/hours, which was about 50% higher than the removal rate of comparative fluid composition C1, which only contained the oxidizer $KMnO_4$, and no iron borate. The MMR could further be increased if the concentration of $Fe^{3+}$ and $H_3BO_3$ was increased by the factor 5, see Sample S2. Similar as $Fe^{3+}$-borate, also $Cu^{2+}$-borate in combination with $KMnO_4$ as oxidizing agent (see Sample S3) showed a strong improvement of the MMR in comparison to comparative sample C1, including only the oxidizing agent $KMnO_4$ or comparative composition C3, containing $KMnO_4$ and boric acid only.

It can be further seen that even by adding to composition C1 an amount of 1 wt % alumina abrasive particles (see composition C2), the polishing efficiency was still lower in comparison to the removal rate of compositions S1, S2, and S3, which were free of abrasive particles. Forming $Co^{2+}$-borate (see Sample S4) did not show under the selected conditions an increase of the MMR in comparison to samples C2 and C3, and only a minor advantage to sample C1.

Description of the Polishing Testing:

All fluid compositions of the examples of the present disclosure were tested for their influence on the material removal rate in polishing 4H-type silicon carbide (4° off-axis) wafers using a Strasbaugh 6EC single sided polishing tool with a D100 polishing pad from Cabot. The silicon carbide wafers had a diameter of 150 mm and a thickness of 350 μm. The material removal rate was calculated from the weight loss measured with an Ohaus Explorer Model FX324 precision scale.

The surface roughness was measured with a Zygo New View 8300+ scanning optical profiler.

The polishing was conducted under the following conditions:

| | |
|---|---|
| Platen diameter (inches) | 22.0 |
| Runtime (min) | 10.0 |
| Down force (psi) | 9.0 |
| Platen speed (rpm) | 103 |
| Head speed (rpm) | 123 |
| PV(Down force · Platen speed) | 533.9 lbs/in · s |
| PV (Down force · Platen speed) | 9554 kg/m · s |
| Head speed/platen speed | 1.19 |
| Flow (ml/min) | 48 |
| flow rate/platen area | 0.126 ml/in² min |
| Polishing pad | D100 |

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A fluid composition comprising: a multi-valent metal borate; at least one oxidizing agent; and a solvent, wherein
   the multi-valent metal borate includes iron(III)borate, copper(II)borate, or a combination thereof;
   the oxidizing agent includes a permanganate salt in an amount of at least 1 wt % to not greater than 20 wt % based on the total weight of the fluid composition; and
   a pH of the fluid composition is not greater than 5.

2. The fluid composition of claim 1, wherein the multi-valent metal borate consists essentially of iron(III)borate.

3. The fluid composition of claim 1, wherein the fluid composition is essentially free of abrasive particles.

4. The fluid composition of claim 3, wherein an amount of the multi-valent metal borate is at least 0.01 wt and not greater than 5 wt % based on the total weight of the fluid composition.

5. The fluid composition of claim 1, wherein a molar ratio of multi-valent metal-ions to boron of the fluid composition ranges from 1:1 to 1:10.

6. The fluid composition of claim 1, wherein the oxidizing agent includes potassium permanganate.

7. The fluid composition of claim 1, wherein the fluid composition is adapted for chemical mechanical polishing of a substrate.

8. The fluid composition of claim 7, wherein the substrate includes a group III-V compound or a group IV-IV compound.

9. A method of polishing a substrate, comprising:
   providing a fluid composition, wherein the fluid composition comprises a multi-valent metal borate, at least one oxidizing agent and water;
   bringing the fluid composition in contact with the substrate and a polishing pad; and
   polishing the substrate,
   wherein the multi-valent metal borate includes iron(III) borate, copper(II)borate, or a combination thereof; and the oxidizing agent includes a permanganate salt in an amount of at least 1 wt % and not greater than 10 wt %, and a pH of the fluid composition is not greater than 5.

10. The method of claim 9, wherein the fluid composition is essentially free of abrasive particles.

11. The method of claim 9, wherein the substrate includes a metal, a metal alloy, a polymer, a group III-V compound, or a group IV-IV compound.

12. The method of claim 11, wherein the substrate includes silicon carbide.

13. A kit adapted for preparing a fluid for polishing a substrate, the kit comprising a first package and a second package, wherein the first package comprises a multi-valent metal salt, wherein an anion of the multi-valent metal salt includes nitrate, chloride, bromide, iodide, sulfate, phosphate, or any combination thereof;
   the second package comprises boric acid;
   the first package or the second package further comprise at least one oxidizing agent, the oxidizing agent including a permanganate salt; and
   the kit is adapted for preparing a fluid for polishing a substrate
   wherein an amount of the permanganate salt of the fluid after combining the first and the second package is at least 1 wt % and not greater than 10 wt %, and a pH of the fluid is not greater than 5.

14. The kit of claim 13, wherein the first package and the second package are essentially free of abrasive particles.

15. The kit of claim 13, wherein the second package comprises the at least one oxidizing agent.

16. The kit of claim 13, wherein the kit is adapted that after combining package 1 and package 2 a multi-valent metal borate is formed in-situ, and wherein the obtained fluid composition is essentially free of abrasive particles.

17. The kit of claim 13, wherein the first package and the second package are essentially free of abrasive particles.

* * * * *